United States Patent
Moody (10) Patent No.: US 9,848,718 B2
(45) Date of Patent: Dec. 26, 2017

(54) ADHESIVE FRAME

(71) Applicant: Reel Life DVD, LLC, Western Springs, IL (US)

(72) Inventor: Valarie Moody, Western Springs, IL (US)

(73) Assignee: Reel Life DVD, LLC, Western Springs, IL (US)

( * ) Notice: Subject to any disclaimer, the term of this patent is extended or adjusted under 35 U.S.C. 154(b) by 470 days.

(21) Appl. No.: 14/195,078

(22) Filed: Mar. 3, 2014

(65) Prior Publication Data

US 2014/0173958 A1    Jun. 26, 2014

Related U.S. Application Data

(63) Continuation-in-part of application No. 12/827,990, filed on Jun. 30, 2010, now abandoned.

(60) Provisional application No. 61/221,680, filed on Jun. 30, 2009.

(51) Int. Cl.
| | |
|---|---|
| *A47G 1/17* | (2006.01) |
| *A47G 1/06* | (2006.01) |
| *B32B 38/00* | (2006.01) |
| *B32B 37/02* | (2006.01) |
| *B32B 37/12* | (2006.01) |
| *B32B 37/20* | (2006.01) |

(52) U.S. Cl.
CPC ............ *A47G 1/17* (2013.01); *A47G 1/0633* (2013.01); *B32B 37/02* (2013.01); *B32B 38/0004* (2013.01); *B32B 37/1284* (2013.01); *B32B 37/203* (2013.01); *B32B 2309/105* (2013.01); *B32B 2309/14* (2013.01); *Y10T 156/108* (2015.01)

(58) Field of Classification Search
USPC ........... 156/277, 290, 291; 40/760, 771, 773
See application file for complete search history.

(56) References Cited

U.S. PATENT DOCUMENTS

| | | | |
|---|---|---|---|
| 3,442,041 A | | 5/1969 | Morgan |
| 3,540,966 A | | 11/1970 | Baker et al. |
| 5,364,671 A | | 11/1994 | Gustafson |
| 5,650,009 A | * | 7/1997 | Himes et al. ................. 118/213 |

(Continued)

OTHER PUBLICATIONS

Declaration of Roger Buck; Oct. 18, 2012; filed in U.S. Appl. No. 12/827,990.*

(Continued)

*Primary Examiner* — Charles A Fox
*Assistant Examiner* — Christopher E Veraa
(74) *Attorney, Agent, or Firm* — Fitch, Even, Tabin & Flannery LLP (57) ABSTRACT

An adhesive frame includes a clear flexible sheet member with an optional printed ink layer disposed on a border of a first side of the clear flexible sheet member. A semi-permanent adhesive layer is disposed on a second side of the clear flexible sheet member at the border of the clear flexible sheet member. No adhesive is disposed in the middle of the adhesive frame, either through using a patterned adhesive or through use of a liner. Such adhesive frames allow for quick and easy mounting of visual media on nearly any surface. Media can be quickly removed and replaced from underneath the adhesive frame because of the lack of adhesive in the middle portion of the adhesive frame.

5 Claims, 4 Drawing Sheets

(56) References Cited

U.S. PATENT DOCUMENTS

| | | | |
|---|---|---|---|
| 5,893,229 A | 4/1999 | Werner | |
| 6,052,933 A | 4/2000 | Lytle | |
| 6,519,885 B2 | 2/2003 | Valiulis | |
| 6,692,806 B2 | 2/2004 | Woods | |
| 6,780,273 B1 | 8/2004 | Bradford | |
| 6,827,812 B2 | 12/2004 | Woods | |
| 7,248,463 B2 | 7/2007 | Bander et al. | |
| 8,166,688 B1 * | 5/2012 | Fragnoli | 40/661 |
| 2006/0032100 A1 | 2/2006 | Alvarez | |
| 2006/0096143 A1 | 5/2006 | Egan | |
| 2007/0089832 A1 | 4/2007 | Kitchin et al. | |
| 2009/0094874 A1 | 4/2009 | Smith et al. | |

OTHER PUBLICATIONS

Final Office Action from parent U.S. Appl. No. 12/827,990 dated Dec. 3, 2013.
Declaration of Valarie Moody Regarding Past Sales of Adhesive Frames, dated Feb. 28, 2014.

\* cited by examiner

ADHESIVE FRAME

RELATED APPLICATION(S)

This application is a continuation-in-part of U.S. application Ser. No. 12/827,990 filed Jun. 30, 2010, which claims the benefit of U.S. Provisional application No. 61/221,680, filed Jun. 30, 2009, each of which is incorporated by reference in their entireties herein.

TECHNICAL FIELD

This invention relates generally to apparatuses for displaying media and more particularly, to flexible adhesive backed frames.

BACKGROUND

Various ways of displaying printed visual media are known in the art. Such approaches include a wide range of apparatuses such as standard picture frames, magnets, nails, putty, and the like. Each of these approaches, however, has various advantages and disadvantages for particular applications. A standard frame for holding a picture, for example, is typically propped up or hung on a wall. Standard frames generally cannot be used to display media on non-conventional surfaces such as on lockers or on laptop covers without special equipment to mount the frame to the given surface. Also, conventional frames require mechanisms for hanging the frames on a wall such as a hanging rail, or making holes in the wall with nails or other apparatus for hanging the picture.

In another approach, visual media may be directly hung on a given surface using a variety of means, such as putty, stickum, tape, or magnets. Each of these approaches, however, has various disadvantages. For example, putty or stickum will generally leave a residue on the media and/or the mounting surface. Tape can be difficult to remove from the media and/or the mounting surface and can damage the surface of either the media or mounting surface. Magnets will only work on certain surfaces.

Other devices are known that are especially made to mount visual media on certain surfaces. For example, some devices are made and designed to specifically mount visual media on laptop covers. Such devices, however, generally include mechanical devices that secure the overall apparatus to the laptop. In another approach, a sleeve is used with adhesive on the backing of the sleeve. The sleeve, however, generally uses excessive material that is prone to bulging in the middle or can snag other elements that slide across the sleeve.

Still another known approach is that of an adhesive frame. The known adhesive frame includes an adhesive covering that covers the entirety of the adhesive frame and attaches to both the visual media to be displayed and the mounting surface. The adhesive that holds the media, however, can damage the media especially over many uses and applications and removal of the adhesive frame. Moreover, replacing pictures hung with such an adhesive connection can be difficult and can require complete removal of the frame from a mounting surface to facilitate replacement of the visual media.

BRIEF DESCRIPTION OF THE DRAWINGS

The above disadvantages are at least partially met through provision of the adhesive frame described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an adhesive frame includes a clear flexible sheet member with a printed ink layer disposed on a border of a first side of the clear flexible sheet member. A semi-permanent adhesive layer is disposed on a second side of the clear flexible sheet member at the border of the clear flexible sheet member. No adhesive is disposed in the middle of the adhesive frame.

So configured, the adhesive frame may be relatively easily mounted using the adhesive disposed at the borders of the adhesive frame. A visual medium, such as a picture, or any other printed media, is held in place by the adhesive frame and disposed next to the clear flexible sheet member where there is no adhesive. In this configuration, for example, the picture is not contacted by the adhesive except at the edges of the picture, thereby preventing potential damage to the picture. The adhesive frame is removably attachable to any mounting surface such that picture may be easily and quickly removed from or replaced within the adhesive frame.

Figure 1:
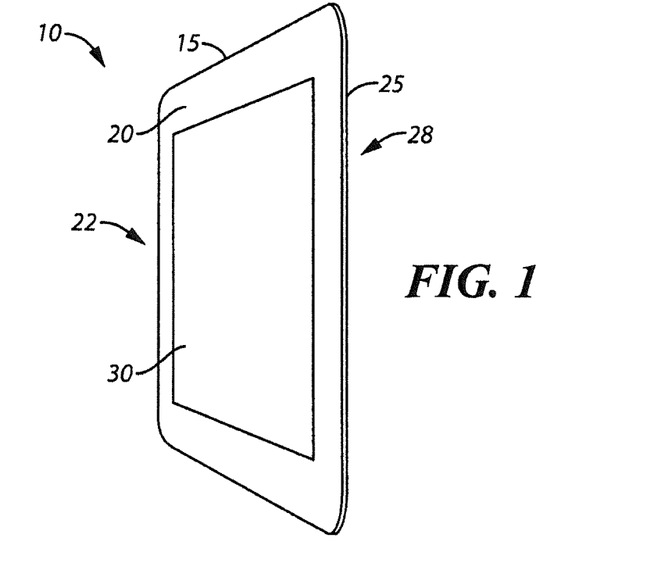
FIG. 1 comprises a front perspective view of an adhesive frame as configured in accordance with various embodiments of the invention.

These and other benefits may become clear upon making a thorough review and study of the following detailed description. Referring now to the drawings, and in particular, to FIG. 1, an illustrative adhesive frame that is compatible with many of these teachings will now be presented. The adhesive frame 10 includes a clear flexible sheet member 15 and a printed ink layer 20 disposed on a border of a first side 22 of the clear flexible sheet member 15. A semi-permanent adhesive layer 25 is disposed on a second side 28 of the clear flexible sheet member 15. A middle portion 30 of the adhesive frame 10 includes no printed ink such that visual media disposed behind the adhesive frame 10 can be seen through the clear flexible sheet member 15. The printed ink layer 20 may comprise any design and may comprise, for example, a four color ink combination. So configured, the border may be made to include any design message or other visual aesthetic that may be desired.

Figure 2:
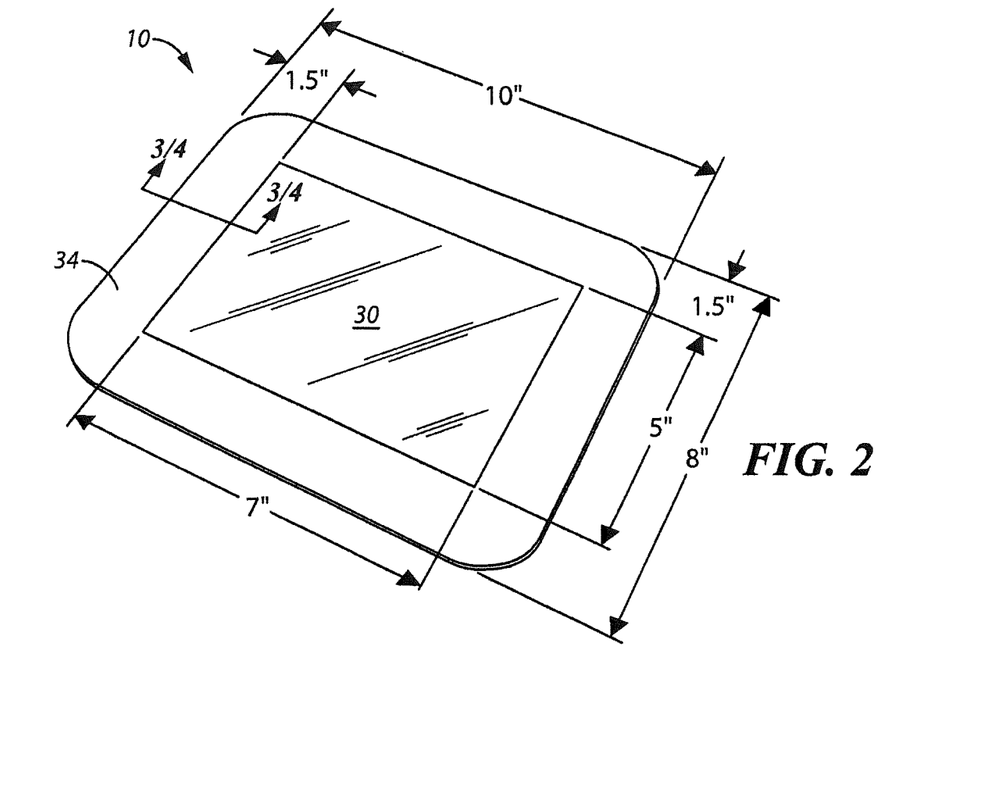
FIG. 2 comprises a front perspective view of an example adhesive frame as configured in accordance with various embodiments of the invention.

In one approach as shown in FIG. 2, the adhesive frame 10 may have a particular dimension sized to fit a laptop cover. In this example, the adhesive frame has an overall length of about 10 inches and a width of about 8 inches. The border 34 of this example is about 1.5 inches wide extending all the way around the outside edge of the adhesive frame 10. In this configuration, a clear see-through portion of the adhesive frame 10 is shown in the middle 30 of the clear flexible sheet member of the adhesive frame. The clear portion of the middle 30 of the adhesive frame 10 has a length of 7 inches (17.78 centimeters) and a width of 5 inches (12.7 centimeters). The middle 30 of the adhesive frame 10 will thus fit any standard 5×7 picture. Other sizes for the adhesive frame 10, the border 34, and the middle 30 can be used to fit any number of applications or media sizes.

Figure 3:
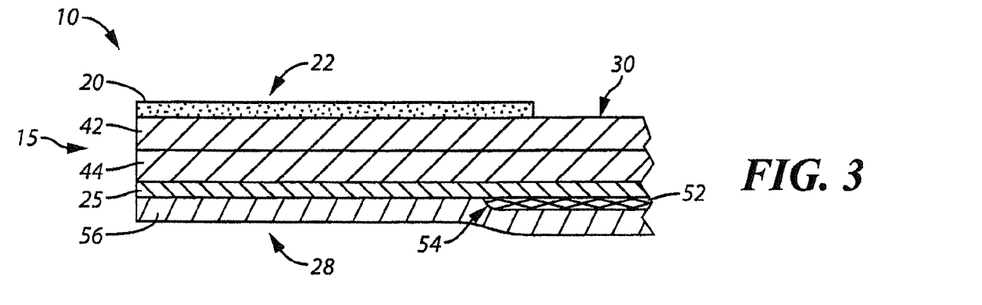
FIG. 3 comprises a cross-sectional view of one approach to the adhesive frame of FIG. 2.

One approach to the structure of the adhesive frame will be described with reference to FIG. 3. In this example, the clear flexible sheet member 15 comprises two flexible sheet members 42 and 44 laminated together. In one such example, the clear flexible sheet member 15 comprises a thickness of at least about 3 millimeters (0.118 inches) to provide sufficient sturdiness for multiple applications and removals. Such a thickness also makes for a more uniform outer look of the adhesive frame 10 wherein a displayed picture's thickness will not substantially alter the look of the adhesive frame. For example, a thinner flexible sheet member 15 may show a significant step down between the area above a displayed picture and the border, which may be undesirable. In an additional aspect, the thicker sheet can prevent the adhesive frame 10 from losing its shape due to stretching, and the durability of the thickness allows for a long-lasting product. In the example of FIG. 3, each of the two clear flexible sheet members 42 and 44 have a thickness of about 2.6 millimeters (about 0.102 inches) such that the clear flexible sheet member 15 has a thickness of about 5.2 millimeters (about 0.205 inches). The clear flexible sheet member 15 may comprise a transparent glossy biaxially oriented top-coated polypropylene film.

A printed ink layer 20 is disposed on a first side 22 of the clear flexible sheet member 15. A semi-permanent adhesive layer 25 is disposed on the second side 28 of the clear flexible sheet member 15. By one approach, the semi-permanent adhesive layer 25 comprises a clear, permanent acrylic dispersion adhesive. A first liner 52 is disposed on the semi-permanent adhesive layer 25 in a position to cover at least substantially the entire clear flexible sheet member without a printed ink layer 20. In other words, the first liner would cover the second side 24 of adhesive frame 10 in such a manner to cover substantially the entire middle portion 30 of the adhesive frame 10. The first liner 52 need not cover exactly to the inside edges of the border of the printed ink layer 20; however, the first liner 52 in one approach overlaps slightly with the outlines of the printed ink layer 20. By one approach, the first liner 52 comprises a clear first liner 52 and in one example is about 2 millimeters (0.0787 inches) thick. As shown in the example of FIG. 3, the first liner 52 includes a rounded corner 54. The rounded corner 54 helps ensure that the first liner 52 stays in place on the semi-permanent adhesive 25 when manipulating the adhesive frame 10 and when removing the second liner 56. The rounded corner 54 is also typically curved (not square) to further reduce separation from the adhesive. The second liner 56 is removably disposed across substantially all of the second side 24 of the clear flexible sheet member 15. The second liner 56 is configured to be removed from the adhesive frame 10 to expose the semi-permanent adhesive 25 prior to mounting of the adhesive frame 10 to a mounting surface such as a wall, a laptop cover, a locker, or the like. Removal of the second liner 56 and not the first liner 52 ensures that the semi-permanent adhesive 25 does not contact the visual medium held in place by the adhesive frame 10.

Another approach to the adhesive frame 10 will be described with reference to FIG. 4. In this approach, a patterned semi-permanent adhesive layer 62 is disposed on the second side 24 of the clear flexible sheet member 15. The patterned semi-permanent adhesive layer 62 is disposed approximately opposite the printed ink layer 20 to leave a middle portion 30 of the second side 24 of the clear flexible sheet member 15 without adhesive. A liner 56 is removably disposed across substantially all of the second sides 24 of the clear flexible sheet member 15. By using a patterned adhesive 62 in this approach, the first liner 52 of the approach of FIG. 3 is not needed. Instead, visual media such as pictures can be disposed in the middle portion 30 of the adhesive frame 10 without at least the majority of the face of the pictures contacting adhesive, preferably with none of the picture contacting adhesive.

In one approach, a patterned adhesive layer 62 is applied to the adhesive frame 10 by using a masking procedure such as those known in the art. The mask blocks the application of adhesive to the middle portion 30 of the adhesive frame 10 while allowing the adhesive to be applied to the border area 34 of the adhesive frame 10 opposite the printed ink layer 20.

Figure 10:
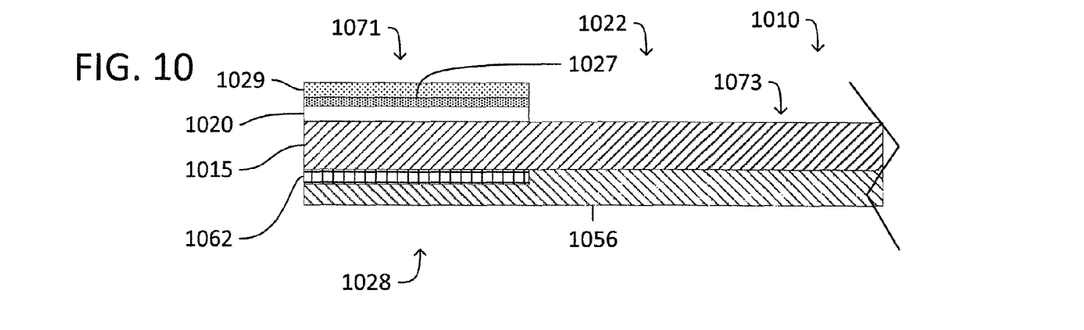
FIG. 10 comprises a cross-sectional view of another example approach to the adhesive frame of FIG. 2.
Figure 11:
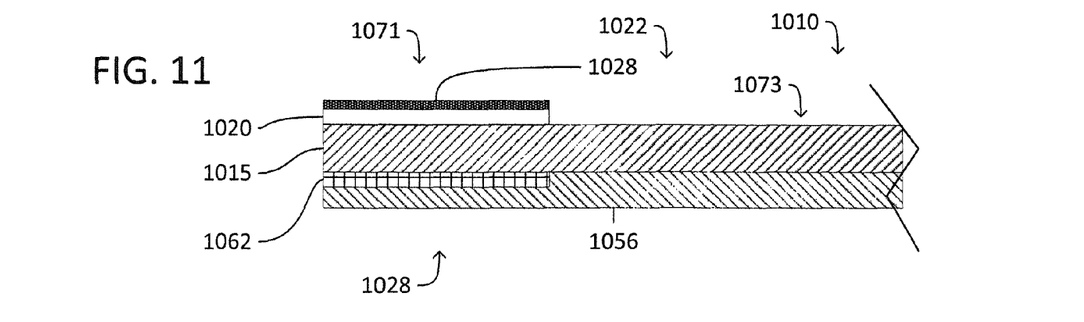
FIG. 11 comprises a cross-sectional view of another example approach to the adhesive frame of FIG. 2.

In another approach illustrated in FIGS. 10 and 11, the patterned semi-permanent adhesive layer is a patterned removable-repositionable adhesive layer 1062 disposed on a second side 1028 of the clear flexible sheet member 1015, opposite that of a printed substrate ink layer 1020 disposed on a border of a first side 1022 of the clear flexible sheet member 1015. In one approach, the printed substrate ink layer 1020 provides a white background onto which later decorative patterns may be printed. For large batches, the decorative patterns can be ink 1028 (FIG. 11) printed directly onto the printed substrate ink layer during inline manufacturing of the removable adhesive frame 1010. For smaller batches, the frame 1010 is manufactured with the printed substrate ink layer 1020 including a top coat 1027 suitable to allow toner based printing 1029 to adhere to the printed substrate ink layer 1020. So configured, very small batches of frames having a particular decorative design can be finished by printing the design 1029 on the top coat 1027 of the printed substrate ink layer 1020 using conventional business printers.

In this approach, the patterned removable-repositionable adhesive layer 1062 is a water-based acrylic adhesive. Water-based acrylic adhesives are preferred over hot melt adhesives because hot melt adhesives can warp the clear flexible sheet member 1015 and potentially adhere too strongly to the mounting surface causing paint or wallpaper peeling from the mounting surface or leaving a residue on the mounting surface when removed and replaced. The applied water-based acrylic adhesive is filtered to remove clumps of adhesive and has a consistency adequate to be smoothed by application of the liner 1056 by in-line application to the patterned removable-repositionable adhesive layer 1062 on the clear flexible sheet member 1015 to substantially flatten the patterned removable-repositionable adhesive layer 1062 to an even coverage for even adhesion between the liner 1056 and the clear flexible sheet member 1015. This consistency is preferred because without even coverage, bumps in the adhesive 1062 caused by clumps of the adhesive 1062 can cause an uneven adhesion between the liner 1056 and the clear flexible sheet member 1015, as well as an uneven adhesion to the surface when applied. Such inability to adhere to the surface will expose the frame to air, thereby causing the adhesive to eventually dry out and lead to the frame falling off the surface. These bumps can then cause printing problems when later printing the decorative design 1029 or 1028 onto the printed substrate ink layer 1020. Many water-based acrylic adhesives do not carry this quality such that they clump. Filtering the adhesive prior to application aids in removing clumps that would otherwise cause undesirable bumps in the adhesive frame.

Moreover, such water-based acrylic adhesives are difficult to apply in a pattern (such as around a border of a frame while leaving the middle portion without adhesive) other than in strips during in-line manufacturing. Generally speaking, strips of adhesive can be readily printed using a brush or roller in strips that follow the direction of the press, but printing adhesive in a pattern that flows both vertically and horizontally requires a different and more difficult process. Creating a pattern such as along the borders of the described adhesive frame with no adhesive in the middle using such strips, for example, would require removing and/or rotating the clear flexible sheet member 1015 between applications of adhesive. Such an approach is very difficult because the adhesive would likely run or contact other mechanical aspects of the process during the transitions. For instance, typical water-based acrylic adhesives typically run and smear beyond the desired pattern when applied to a polypropylene film based sheet member, which is undesirable for the described application because it may cause unintended bonding or damage to a displayed medium. In another approach, the adhesives can be applied using gravure or screen printing. Such screen printing of adhesives, however, suffers from the clumping of the water-based acrylic adhesives as discussed above. Accordingly, to overcome these difficulties, use of a water-based acrylic adhesive having the described consistency is used together with filtering out clumps of adhesive that could later cause faulty printing. Additionally, the in-line press process can be slowed to further improve the accurate screen printing of the adhesive. For example, instead of operating at a speed of up to 1000 feet per minute, the in-line press process can be operated at a speed of between about 500 feet per minute and about 600 feet per minute, which reduces the tendency of the water-based acrylic adhesive to run outside of the desired placement and helps assure that the plate that applies the adhesive to properly contact the clear sheet to apply the adhesive without smearing. Accordingly, water-based acrylic adhesives having the particular properties discussed herein are used for a preferred approach in constructing the described replaceable adhesive frames.

Thus, to assure good quality printing of the decorative design for typical printing operations, the patterned removable-repositionable adhesive layer 1062 includes a consistency adequate to be smoothed by application of the liner 1056 by in-line application to the patterned removable-repositionable adhesive layer 1062 on the clear flexible sheet member 1015 and filtered to substantially have only bumps in the patterned removable-repositionable adhesive layer 1062 away from the clear flexible sheet member 1015 less than 0.5 millimeters. For instance, the adhesive 1062 may be a clear permanent acrylic dispersion adhesive. One example of an applicable adhesive is 3M's Screen-Printable Adhesive SP7533.

The patterned removable-repositionable adhesive layer 1062 is disposed around a substantial portion of the border 1071 in a configuration to not cover at least a middle portion 1073 of the clear flexible sheet member 1015. The portion of the clear flexible sheet member 1015 not covered in the patterned removable-repositionable adhesive layer 1062 is configured to provide a non-stick surface of the clear flexible member 1015 configured to engage a visual medium and allow display of the visual medium through the clear flexible sheet member 1015 when the liner 1052 is removed and the patterned removable-repositionable adhesive layer 1062 engages a mounting surface.

Figure 5:
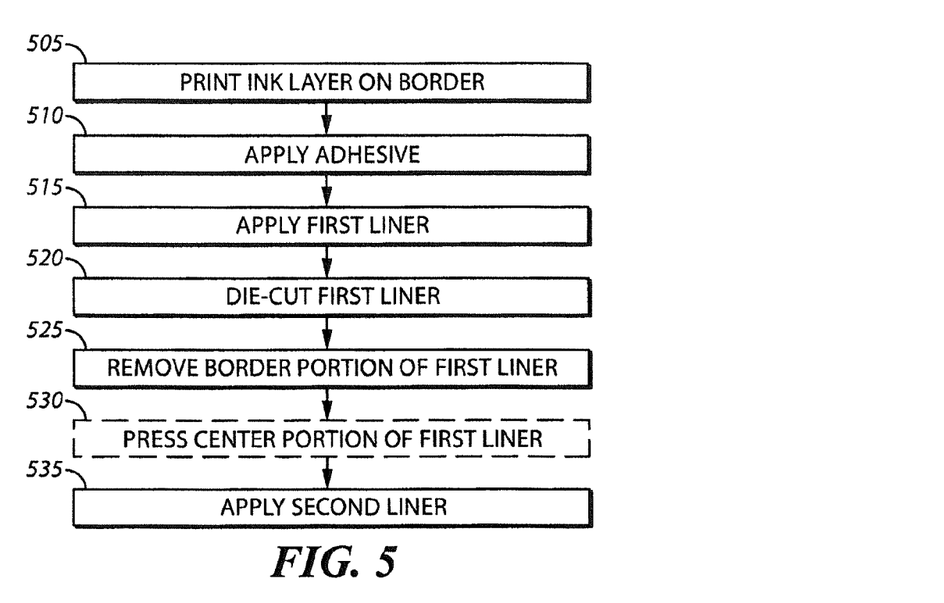
FIG. 5 comprises a flow chart of an example method for making an adhesive frame in accordance with various embodiments of the invention.

A method of making a flexible adhesive frame according to the example of FIG. 3 will be described with reference to FIG. 5. The method includes printing 505 an ink layer 20 on a border 34 of a first side 22 of a clear flexible sheet member 15. After printing the ink layer 20, the clear flexible sheet member 15 is flipped such that in a next step a semi-permanent adhesive layer 25 is applied 510 to a second side 28 of the clear flexible sheet member 15. A first liner 52 is applied 515 to the semi-permanent adhesive layer 25, substantially covering the whole of the second side 28 of the clear flexible sheet member 15. The first liner 52 is die-cut in step 520 to create a border portion of the first liner 52 approximately corresponding to the ink layer 20 and a center portion of the first liner 52. The die-cutting may be performed in such a way to round the edges 54 of the center portion of the first liner 52 to help ensure that the first liner 52 remains in place. The border portion of the first liner 52 is then removed 525 to expose the semi-permanent adhesive layer 25. Optionally, at step 530 the center portion of the first liner 52 is pressed into the adhesive to make the first liner 52 less likely to be separated from the semi-permanent adhesive layer 25. At step 535 a second liner 56 is applied across at least a portion of the second side 28 of the clear flexible sheet member 15 corresponding to the border 34 portion of the clear flexible sheet member 15. As shown herein, the second liner 56 generally covers the entire backside 28 of the adhesive frame 10. In other approaches, the second liner 56 may only cover the exposed portions of the semi-permanent adhesive layer 25.

Figure 4:
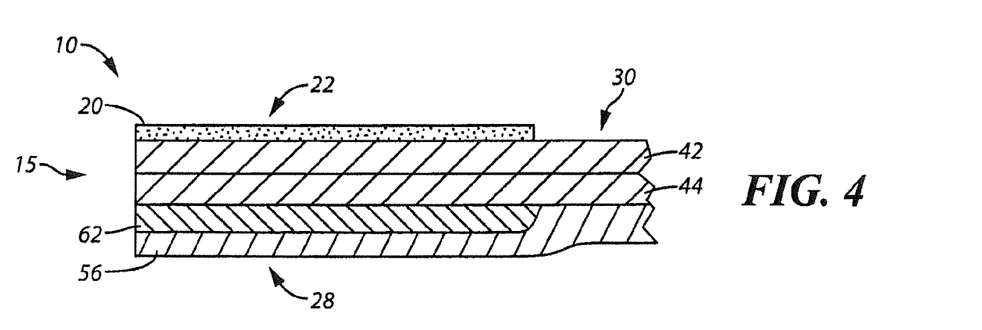
FIG. 4 comprises a cross-sectional view of another approach to the adhesive frame of FIG. 2.

When creating an adhesive frame according to the example of FIG. 4, the above method is modified such that the application of the semi-permanent adhesive layer 25 is done with a masking process to leave the middle portion 30 of the adhesive frame 10 without adhesive. Also, the steps regarding the first liner 52 are not completed because the first liner 52 is not needed in view of the lack of adhesive in the middle portion 30 of the adhesive frame 10. Either of the above methods may optionally include laminating together two or more clear flexible members to create a base clear flexible member. Moreover, each of the above methods are advantageous because the middle portion 30 retains a clearness through which a displayed picture can be viewed that certain previous adhesive frames could not obtain. For example, deadening adhesive in the middle portion 30 of an adhesive fame using known techniques can result in clouding of the deadened portion.

Figure 12:
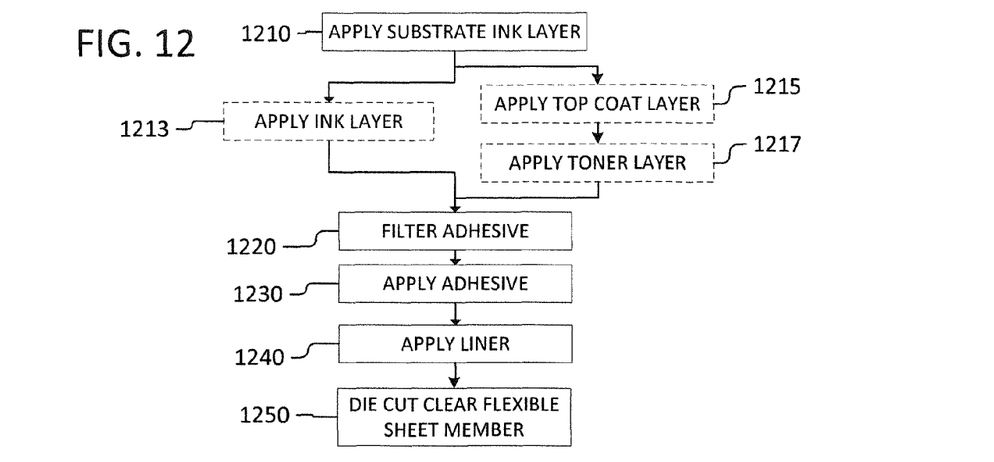
FIG. 12 comprises a flow chart of another example method for making an adhesive frame in accordance with various embodiments of the invention.

Another approach to making an adhesive frame, such as those of the examples of FIGS. 10 and 11, is described as follows with reference to FIG. 12, with one or more of the steps performed in an in-line process to facilitate rapid production of the frames.

A substrate ink layer is applied 1210 by gravure or screen printing on a border of a first side of a clear flexible sheet member. If the frame is part of a larger order, a decorative design in the form of an ink layer is applied 1213 on the substrate ink layer by gravure or screen printing. Otherwise, a top coat is applied 1215 to the substrate ink layer by gravure or screen printing to allow later printing of decorative designs on the top coat by separate, conventional printers. For instance, a toner-based print layer can be applied 1217 on the top coat layer of the first side of the clear flexible sheet member by gravure or screen printing.

The method further includes applying 1230 by gravure or screen printing a patterned removable-repositionable adhesive layer using a water-based acrylic adhesive to a second side of the clear flexible sheet member. The patterned removable-repositionable adhesive layer disposed around a substantial portion of the border in a configuration to not cover at least a middle portion of the clear flexible sheet member. To facilitate application of the adhesive in a manner suitable for the adhesive frames, in certain approaches, the applying by gravure or screen printing the patterned removable-repositionable adhesive layer can be accomplished by applying the patterned removable-repositionable adhesive layer using an in-line process operating at a speed of between about 500 feet per minute and 600 feet per minute. This speed range limits the amount of running of the adhesive beyond the desired adhesive locations and allows for the plate that applies the adhesive to accurately contact the clear flexible sheet member without smearing the adhesive.

Prior to applying by gravure or screen printing the patterned removable-repositionable adhesive layer, the water-based acrylic adhesive is filtered 1220 to remove clumps of the water-based acrylic adhesive. By one approach, the filtering includes filtering the water-based acrylic adhesive to remove clumps in the water-based acrylic adhesive larger than 0.5 millimeter. This filtering can be applied in any number of ways. For example, the adhesive may be poured or pushed through a screen before or as part of introducing the adhesive to the gravure or screen printing apparatus. The screen has apertures configured to capture clumps of adhesive larger than 0.5 millimeter. For example, the screen may have apertures sized smaller than 0.5 millimeter such that clumps of adhesive larger than this are captured and not introduced to the printing process where the clumps might cause printing problems on the adhesive frame.

A liner is applied 1240 to the patterned removable-repositionable adhesive layer in part to effect smoothing of the patterned removable-repositionable adhesive layer on the clear flexible sheet member to substantially flatten the patterned removable-repositionable adhesive layer to an even coverage for even adhesion between the liner and the clear flexible sheet member. The even coverage and adhesion allows for high quality printing of the decorative design because bumps caused by the adhesive can adversely affect design printing. In one application, the application of the patterned removable-repositionable adhesive layer comprises applying a water-based acrylic adhesive having a consistency adequate to be smoothed by application of the liner by in-line application to the patterned removable-repositionable adhesive layer on the clear flexible sheet member to substantially have only bumps in the patterned removable-repositionable adhesive layer away from the clear flexible sheet member less than 0.5 millimeter. The clear flexible sheet member is die-cut 1250 around the border to make a border and middle portion of the clear flexible sheet member removable from the liner.

Figure 6:
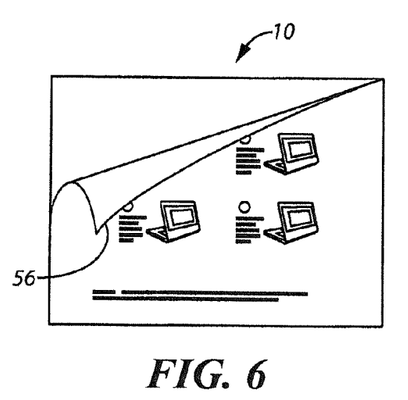
FIGS. 6-9 comprise example views of mounting a picture with an adhesive frame in accordance with various embodiments of the invention.
Figure 7:
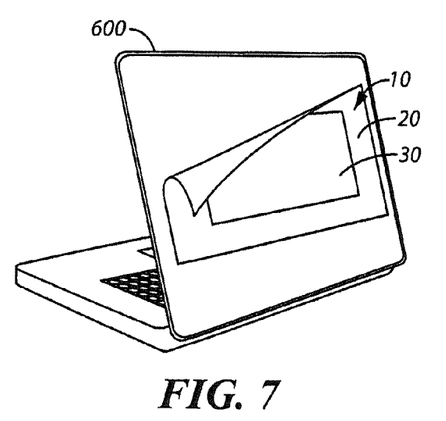
Figure 8:
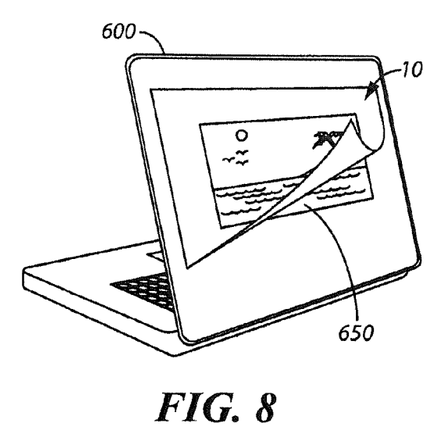

The use of an adhesive frame on a laptop cover will be described with reference to FIGS. 6-9. In FIG. 6, an adhesive frame 10 is shown with the second liner 56 being peeled away from the second side 28 of the adhesive frame 10. With the adhesive 25 exposed by the removal of the second liner 56, and with reference to FIG. 7, the adhesive frame 10 can be disposed on the top of the laptop 600 such that the printed ink layer 20 is visible to those looking at the top of the laptop 600. A middle clear portion 30 of the adhesive frame 10 allows viewing through to the back of the laptop 600. As shown in FIG. 8, a visual medium such as a picture 650 is inserted behind the adhesive frame 10 after the adhesive frame 10 is peeled back to reveal a portion of the laptop 600. The printed medium 650 is able to slide up underneath the middle portion 30 of the peeled back adhesive frame 10 that has no exposed adhesive without completely removing the adhesive frame 10 from the laptop 600.

Figure 9:
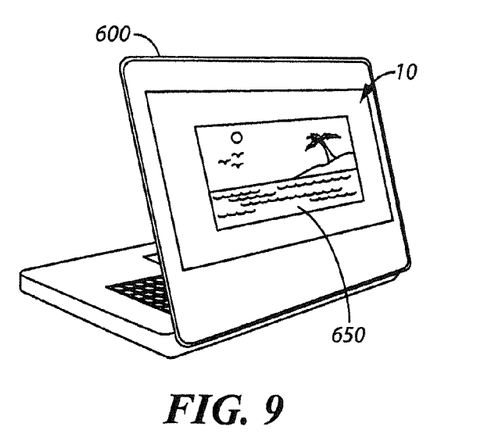

With reference to FIG. 9, once the visual media 650 is in place, the adhesive frame 10 is then smoothed back over the laptop 600 thereby securing the visual medium 650 into place and allowing viewing of this visual medium 650 through the clear middle portion 30.

So configured, adhesive frames such as those described herein allow for quick and easy mounting of visual media on nearly any surface. Media can be quickly removed and replaced from underneath the adhesive frame because of the lack of adhesive in the middle portion of the adhesive frame. Use of the clear adhesive and a clear first liner combined with a clear polypropylene film allows the visual media to be seen clearly through the adhesive frame without having to be adhered directly to the adhesive frame.

Those skilled in the art will recognize that a wide variety of modifications, alterations and combinations can be made with respect to the above described embodiment without departing from the scope of the invention. For example, adhesive frames of different sizes, different borders, and different non-adhesive middle portions can be made to suit a variety of applications. Similarly, the size and design of the printed ink border can be modified as needed. Moreover, the printed ink border may be made clear or not included to allow display of the mounting surface. Different materials having properties in accordance with the above descriptions may also be used. Such modifications, alterations and combinations are to be viewed as being within the ambient of the inventive concept.

What is claimed is:

1. An apparatus comprising:
    a clear flexible sheet member;
    a printed substrate ink layer disposed on a border of a first side of the clear flexible sheet member;
    a patterned removable-repositionable adhesive layer disposed on a second side of the clear flexible sheet member, the patterned removable-repositionable adhesive layer disposed around a substantial portion of the border in a configuration to not cover at least a middle portion of the clear flexible sheet member;
    a liner removably disposed across substantially all of the second side of the clear flexible sheet member;

wherein the portion of the clear flexible sheet member not covered in the patterned removable-repositionable adhesive layer is configured to provide a non-stick surface of the clear flexible member configured to engage a visual medium and allow display of the visual medium through the clear flexible sheet member when the liner is removed and the patterned removable-repositionable adhesive layer engages a mounting surface;

wherein the patterned removable-repositionable adhesive layer consists of a removable-repositionable water-based acrylic adhesive filtered to remove clumps of adhesive and having a consistency adequate to be smoothed by application of the liner by in-line application to the patterned removable-repositionable adhesive layer on the clear flexible sheet member to substantially flatten the patterned removable-repositionable adhesive layer to an even coverage for even adhesion between the liner and the clear flexible sheet member.

2. The apparatus of claim 1 wherein the clear flexible sheet member comprises two clear flexible sheet members laminated together.

3. The apparatus of claim 1 wherein the clear flexible sheet member comprises a thickness of at least about 3 millimeters.

4. The apparatus of claim 1 wherein the clear flexible sheet member comprises a transparent, glossy, biaxially oriented, top-coated polypropylene film.

5. The apparatus of claim 1 wherein the patterned removable-repositionable adhesive layer includes bumps in the patterned removable-repositionable adhesive layer away from the clear flexible sheet member less than 0.5 millimeters and comprises a consistency adequate to be smoothed by application of the liner by in-line application to the patterned removable-repositionable adhesive layer on the clear flexible sheet member and filtered to substantially have only bumps in the patterned removable-repositionable adhesive layer away from the clear flexible sheet member less than 0.5 millimeters.

* * * * *